April 3, 1928.　　　　　　　　　　　　　　　　　1,664,661
G. C. CHASE
FULL CYCLE POSITIONING MECHANISM
Filed Nov. 7, 1925　　　　9 Sheets-Sheet 1

Inventor
Geo. C. Chase.
E. W. Anderson

By

Attorney

April 3, 1928.

G. C. CHASE 1,664,661

FULL CYCLE POSITIONING MECHANISM

Filed Nov. 7, 1925

Inventor
Geo. C. Chase.
E. W. Anderson Son.
By
Attorney

April 3, 1928.

G. C. CHASE 1,664,661

FULL CYCLE POSITIONING MECHANISM
Filed Nov. 7, 1925

Inventor
Geo. C. Chase.
E. W. Anderson Son.
By
Attorney

April 3, 1928.
G. C. CHASE
1,664,661
FULL CYCLE POSITIONING MECHANISM
Filed Nov. 7, 1925
9 Sheets-Sheet 4
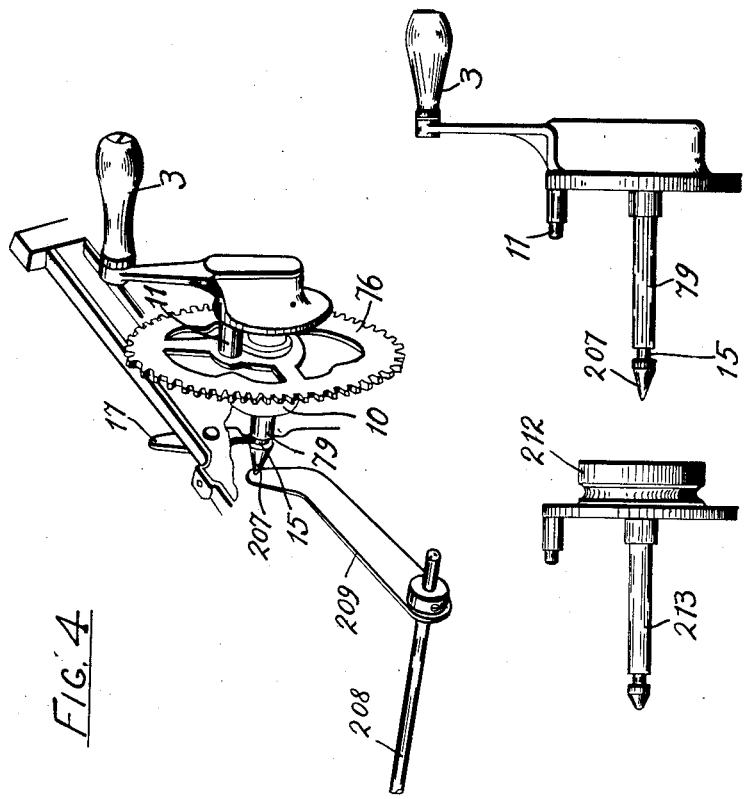
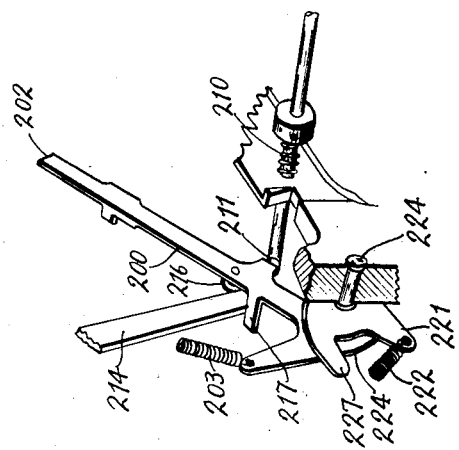
Inventor
Geo. C. Chase.
E. W. Anderson
By
Attorney

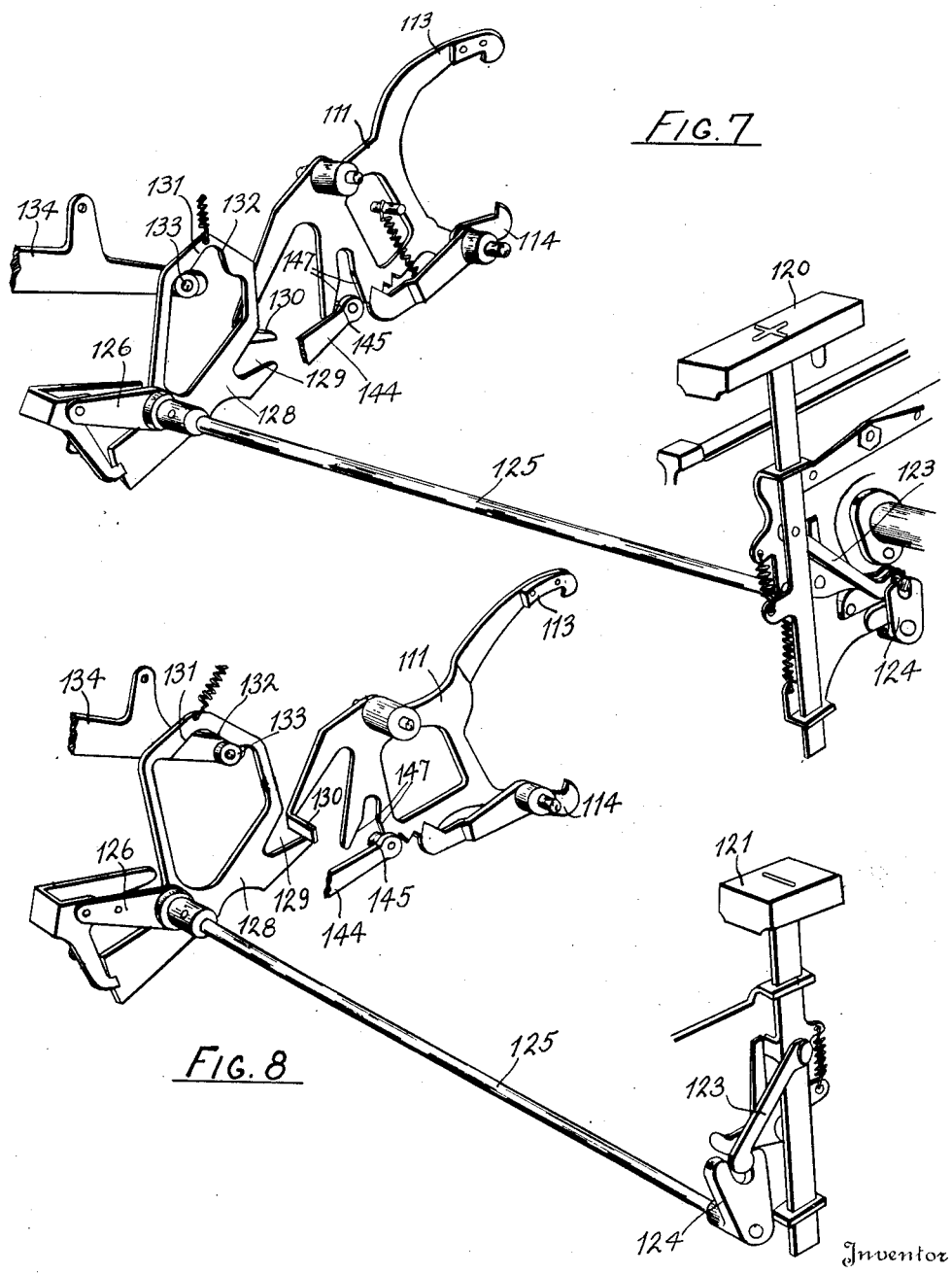

April 3, 1928.
G. C. CHASE
1,664,661
FULL CYCLE POSITIONING MECHANISM
Filed Nov. 7, 1925
9 Sheets-Sheet 6
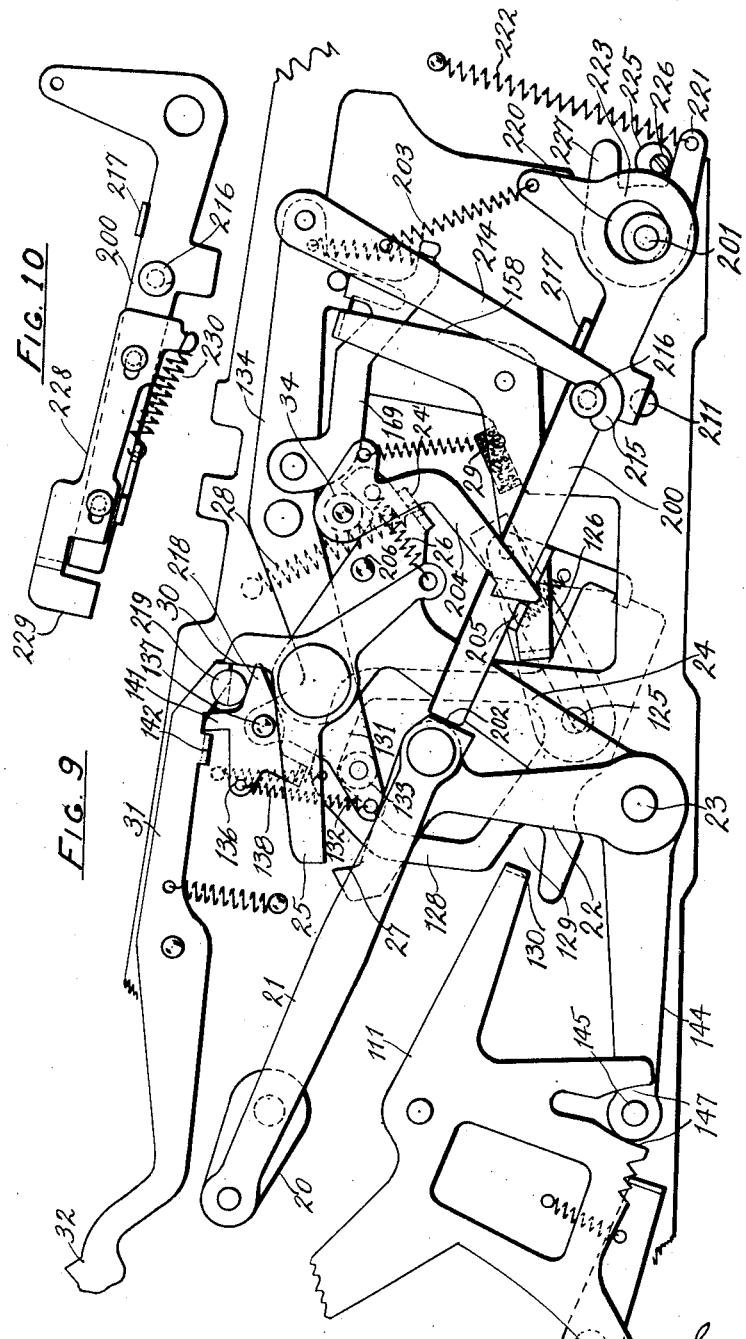
Inventor
Geo. C. Chase
E. W. Anderson Jon.
By
Attorney

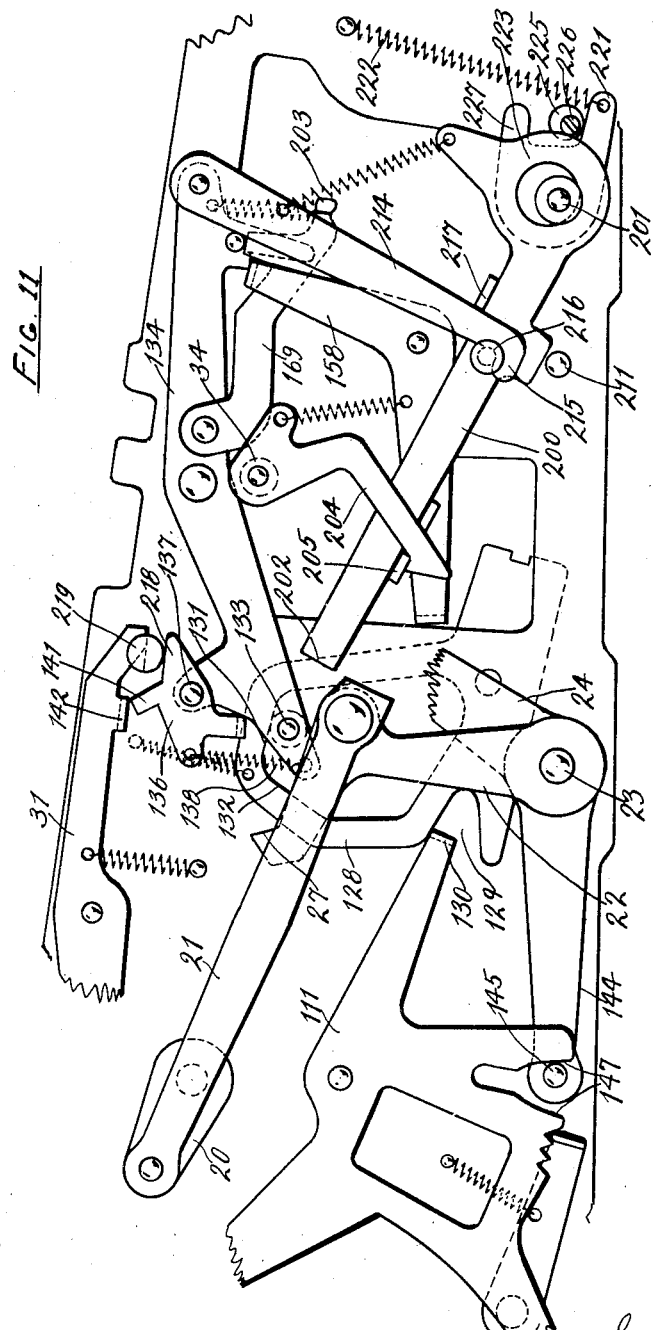

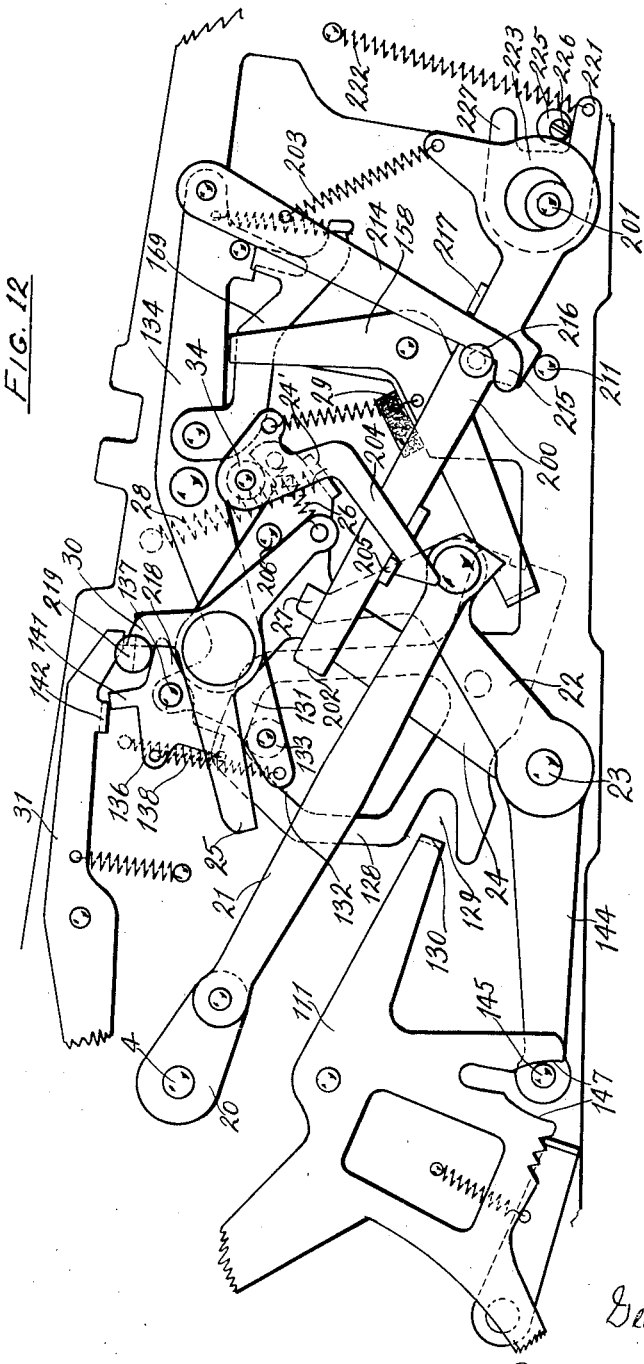

April 3, 1928.
G. C. CHASE
1,664,661
FULL CYCLE POSITIONING MECHANISM
Filed Nov. 7, 1925
9 Sheets-Sheet 9
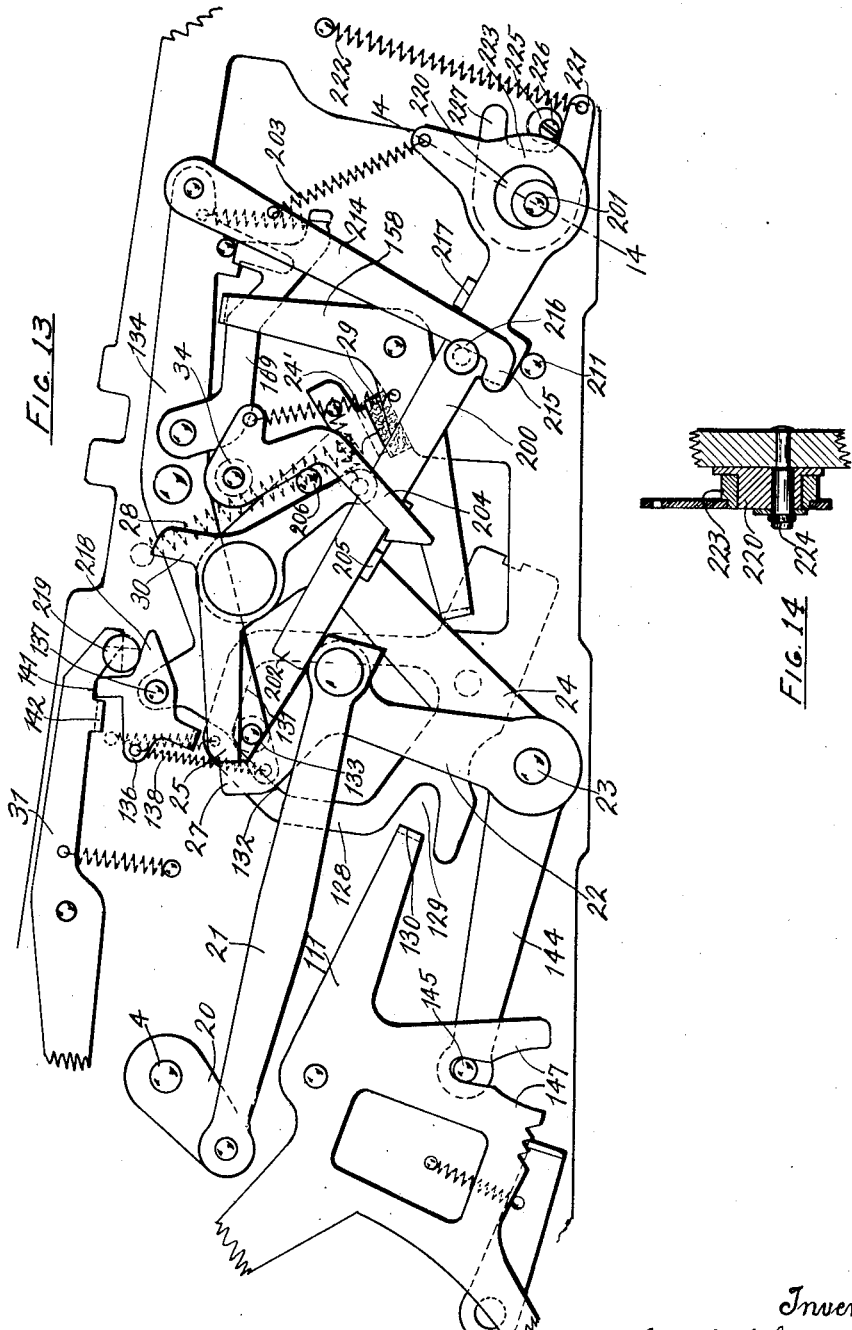
Inventor
Geo. C. Chase.
E. W. Anderson
By
Attorney Patented Apr. 3, 1928.

1,664,661

UNITED STATES PATENT OFFICE.

GEORGE C. CHASE, OF SOUTH ORANGE, NEW JERSEY, ASSIGNOR, BY MESNE ASSIGNMENTS, TO MONROE CALCULATING MACHINE COMPANY, OF ORANGE, NEW JERSEY, A CORPORATION OF DELAWARE.

FULL-CYCLE POSITIONING MECHANISM. REISSUED

Application filed November 7, 1925. Serial No. 67,676.

The invention has relation to means whereby the actuating mechanism of a calculating machine may be brought to rest in full-cycle position upon the completion of an operation.

An object of the invention is to provide improved means for this purpose whereby a motor driven machine may be brought to rest promptly with a minimum shock to the mechanism, and may be locked in full-cycle position. Another object is to provide means, in connection with a machine having provision for alternative motor or hand operation, whereby the machine may be set for hand operation by the act of attaching a removable hand operating member, and may be set for motor operation by the removal of said member. Other objects and advantages will hereinafter appear.

The invention consists in the novel construction and combinations of parts, as set forth in the appended claims.

The invention is shown as applied to a machine of the reversible cycle type set forth in the U. S. patent to E. F. Britten, Jr., No. 1,474,230, as modified by the application thereto of the full-cycle stopping means disclosed in the patent to George C. Chase, No. 1,544,806, issued July 7, 1925, and of alternative motor driving means, corresponding in part to the disclosure of Patent No. 1,566,650, issued to George C. Chase, December 22, 1925.

In the accompanying drawings, illustrating the invention in its application to the machine above stated:

Figure 4 is a detail perspective view of the lock lever disabling means.

Figure 5 is a detail plan view of the hand crank.

Figure 6 is a similar view of the protecting knob.

Figure 7 is a detail perspective view of the add key and associated parts, with the key in depressed position.

Figure 8 is a similar view of the subtract key.

Figure 9 is an enlarged left-hand side view of the stopping mechanism, with parts in normal position.

Figure 10 is a detail side view of a modified form of cushioning means.

Figure 11 is a view similar to Figure 9, showing the parts in position with the add key depressed.

Figure 12 is a similar view, showing the parts in position taken during the release of the add key.

Figure 13 is a similar view, with the parts in stopped position at the end of the additive idle zone.

Figure 14 is a detail sectional view, taken on the line 14—14, Figure 13.

Figure 2:
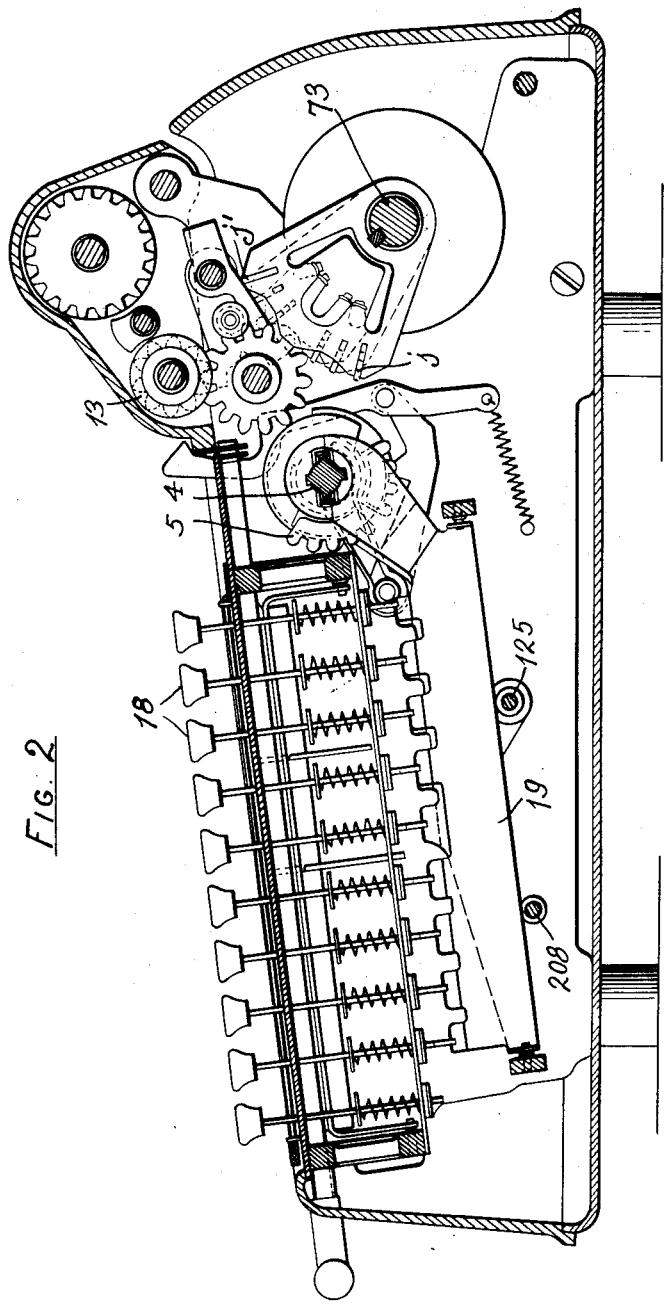
Figure 2 is a section, taken on line 2—2, Figure 1.
Figure 3:
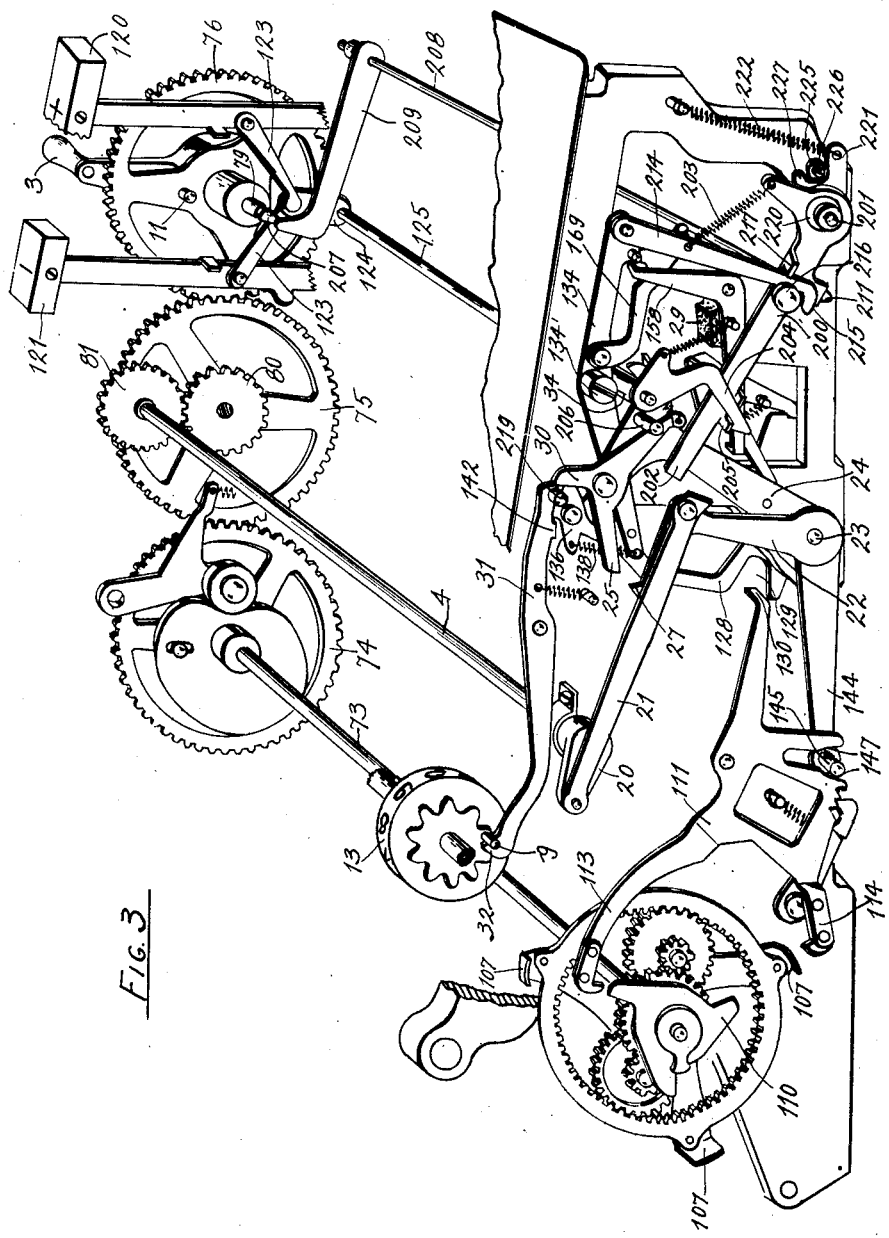
Figure 3 is a perspective view from the left-hand side of the machine, with the casing removed and parts broken away.

*Actuating mechanism. Figures 2 and 3.*

According to the above mentioned patent to Britten, differential actuating members 5 (Fig. 2), mounted upon shaft 4, are selectively set to position by digital keys 18, through rock bars 19. Shaft 4 has one-to-one ratio gearing connection 81, 80, 75, 74 (Fig. 3), with a shaft 73, upon which are mounted two oppositely pitched spiral series of carry teeth $j$, $j'$, (Fig. 2), either of which series may cooperate with the differential members 5 to register upon numeral wheels 13 values in accordance with the keyboard setting.

The selector and carry members are reversible, rotation of shafts 4 and 73 in one direction serving to add or multiply, and rotation in a reverse direction serving to subtract or divide. Also, as set forth in said Chase patents, the cycle of operation is reversible; that is to say, the phases of the cycle occur in reversed order when the operation is reversed, so that the carry phase which follows the ordinal registration during additive operation will idly precede the ordinal phase in subtractive operation, and vice versa. Thus, upon starting an operation of the actuating mechanism in either direction from full-cycle position (the starting and finishing point), the first phase of the cycle (about one-fourth turn of the actuating mechanism, as shown) is an idle phase, in that no movement is transmitted to the numeral wheels 13.

*Full-cycle stop. Figure 3.*

The full-cycle stopping means disclosed in the Chase Patent No. 1,544,806, above referred to provides for stopping continued forward rotation of the actuating mechanism, in case of passage of the numeral wheels 13 from positive to negative or from negative to positive registration. For this purpose selector shaft 4 is provided with a crank arm 20 (Fig. 3), connected by link 21 with a rock-lever 22, fulcrumed at 23 to the framing of the machine. An arm 24, also pivoted at 23, has pivotally mounted thereon a stop element 25, adapted to be engaged by the action of spring 26 with a shoulder 27 of rock-lever 22. Retraction spring 28 serves to hold arm 24 against stop pin 34, and, by contact of lug 30 of element 25 with one arm of a trigger lever 31, to hold stop element 25 out of engagement with shoulder 27, against the tension of the weaker spring 26. In this position of the parts rock-lever 22 will oscillate idly in the rotation of the actuating mechanism.

Trigger lever 31 is fulcrumed intermediately of its length, and the arm thereof opposite that engaged by stop element 25 is provided with a double-beveled cam face 32, lying in the path of movement of a pin $q$ of one of the numeral wheels 13. As explained in the above-mentioned patent, upon passage of the numeral wheels 13 from positive to negative or from negative to positive registration this numeral wheel (associated with the extreme left-hand carry member) will move one step, and its pin $q$ will contact with cam face 32 and cause trigger lever 31 to release stop element 25, said trigger lever thereafter falling and riding upon lug 30. As crank arm 20 rotates to its rearward dead center position, element 25 will drop in front of shoulder 27. Continued rotation of the actuating mechanism will now rock lever 22 and arm 24 as a unit, against the tension of spring 28, until a portion 24' of arm 24 comes in contact with a fixed stop 29, whereby the actuating mechanism will be stopped in the idle zone, beyond full-cycle position. Spring 28, having acted to cushion the stopping contact, now tends to return the actuating mechanism to full-cycle position, whereupon stop element 25 is automatically released from rock-lever 22.

*Locking mechanism. Figures 3 and 13.*

The above paragraphs describe the complete operation of the full-cycle stop when the machine is being operated by hand, but in motor operation the rebound of the parts following the contact of arm 24 with stop 29 is likely to carry the actuating mechanism reversely out of the idle zone, and according to the present invention means are provided to stop and also to lock said mechanism in full-cycle position upon its return thereto by the action of the rebound and of spring 28.

Lock lever 200 is fulcrumed to the framing (Fig. 3), and has at its free end a face 202 adapted under the influence of spring 203 to engage the forward end of link 21 when crank arm 20 is in rearward dead center position, said position corresponding to the full-cycle position of the actuating mechanism. Lock lever 200, under the conditions hereinafter set forth, is held from dropping into locking position by engagement of a spring-pressed pivoted latch 204 with lug 205 of said lever. As arm 24 is rocked forwardly in the operation of the full-cycle stop (Fig. 13), a pin 206 of said arm will contact with latch 204 and release lock lever 200 therefrom, which lever will first fall upon link 21 and, riding thereon in the operation of the machine, will thereafter drop to locking engagement with the end of the link as the parts are returned to full-cycle position.

In a machine designed for high speed operation the actuating mechanism, when arrested at full-cycle position by the lock lever, will still have considerable momentum, and to reduce the shock of bringing the parts suddenly to rest, the lock lever is provided with spring cushioning means, whereby a slight yielding of said lever is permitted under the impact of link 21.

Preferably this cushioning means comprises an eccentric 220 (Figs. 13 and 14), whereon is rigidly mounted a crank arm 221, to the free end of which is attached one end of a coiled spring 222. Lock lever 200, provided with an extended hub 223, is mounted on the eccentric, the pivot bolt 224 for said eccentric being mounted at one end in the framing.

The degree of eccentricity of eccentric 220 plays an important part in obtaining the advantages of this design. The less this eccentricity the greater will be the pressures in the bearings on pivot bolt 224 and eccentric 220 when link 21 drives lock lever 200, resulting in greater frictional losses in the bearings. If the eccentricity is too small, the bearing pressures and the friction resulting therefrom would be large enough to prevent the eccentric from moving, and the purpose of this cushion stop device would be defeated. If the eccentricity is too great, too much energy will be transmitted through the eccentric to the spring 222 where it will be stored and largely returned to lock lever 200 when spring 222 retracts and restores eccentric 220 to normal. Also spring 222 would have to be made quite strong in order to retard the movement of the parts quickly enough.

As the object of this mechanism is to check the movement of the parts, it is obvious that frictional drag in the bearings on pivot bolt 224 and eccentric 220 is desirable during the checking action. This effect is obtained by providing the degree of eccentricity in eccentric 220 whereby most of the energy is absorbed in the bearings, just enough being transmitted to spring 222 to permit it to restore the parts to their normal position after the energy has been dissipated, at which time the bearing pressures have fallen back to normal and the spring 222 need be only strong enough to perform its simple restoring action at a moderate speed, whereby there will be no further oscillation of the parts. Although this construction calls for high bearing pressures and considerable friction in the bearings, the use of the eccentric also provides that the dimensions of the bearings shall be ample to withstand these loads.

Crank arm 221 is made considerably longer than the eccentricity of eccentric 220, whereby the movement imparted to spring 222 is multiplied, permitting said spring to be made relatively long and light in tension, which is very desirable from the standpoint of production and operation.

Means are provided to adjust the position of the lock lever relative to the link 21, so that there will be no excessive lost movement between link and lever in the operation of the stop. The adjusting means consists of an eccentric disk 225, rotatably adjustable about its pivot 226 and fixed in position as adjusted by tightening its pivot bolt or screw, said disk being located between crank arm 221 and a spaced lug 227 of eccentric 220, and acting as a stop to fix the normal position and to limit the movement of said eccentric, which is allowed a degree of movement which is constant, in all positions of the parts determined by adjustment of the eccentric disk.

An alternative form of the cushioning device is shown in Figure 10, wherein lock lever 200 is provided with a slide extension 228, having an end lug 229 projecting beyond the free end of said lock lever and normally held spaced therefrom by spring 230. Contact of link 21 is made with lug 229, and movement of said link, with the actuating mechanism, is resisted by spring 230, which will also return the slide extension to normal position. The cushioning movement is limited by engagement of lug 229 with the end of lever 200.

*Means for disabling the lock lever. Figures 3, 4, 5 and 6.*

During hand operation it is not desired to lock the actuating mechanism, and means are therefore provided for automatically disabling the lock lever 200 when the hand crank is applied to the machine, said means automatically resuming inactive position upon removal of the hand crank.

Crank 3 (Figs. 4 and 5) is removably mounted in accordance with the disclosure of U. S. Patent No. 1,369,663, dated Nov. 8, 1921, said crank having a journal 79 adapted for engagement within a tubular or sleeve extension 10 of the framing and being also provided with an eccentric pin 11 engaging a suitable seat perforation of driving gear 76, mounted upon said sleeve extension and meshing with the gear 75. A spring-pressed latch device 17, mounted upon the inner face of the supporting frame and engaging a groove 15 of journal 79, serves to hold the crank handle removably in position.

In the present instance journal 79 is provided with a tapered extension 207, adapted when the crank handle is pushed to fully seated position to displace a push rod 208 (Figs. 3 and 4) in an endwise direction, through contact with an arm 209 thereof, against the tension of a spring 210, and thereby to force the cam end 211 of said push rod against lock lever 200 and raise the same out of locking engagement with link 21. Latch 17 now fixing the parts in adjusted position, lock lever 200 will be held in released position until crank handle 3 is removed from the machine, when spring 210 will retract push rod 208 and leave the lock lever free to be brought into engagement with link 21 upon action of the stop during motor operation.

A knob 212 (Fig. 6) prferably replaces handle 3, said knob having a journal 213 shorter than journal 79 with its extension 207 and therefore incapable of operating the push rod.

*Motor operation. Figures 7, 8, 9, 11, 12 and 13.*

In motor operation the full-cycle stopping means, in addition to its function of stopping the machine when the numeral wheels pass from positive to negative registration, or vice versa, is utilized to release a clutch connection between the motor and the actuating mechanism and to bring the released actuating mechanism to rest in full-cycle position at the end of every operation.

The means for this purpose shown in Patent No. 1,566,650, hereinbefore referred to, has been modified to cooperate with lock lever 200, the operation of this modified mechanism being briefly as follows, and said patent being referred to for details of mechanism not directly involved in the present invention:

Motor A with its shaft rotates in one direction only, planetary gear mechanism (Fig. 3) being employed, together with a selectively operated clutch, for transmitting forward or reverse motion to carry shaft 73 and therethrough to the other actuating mechanism of the machine.

Figure 1:
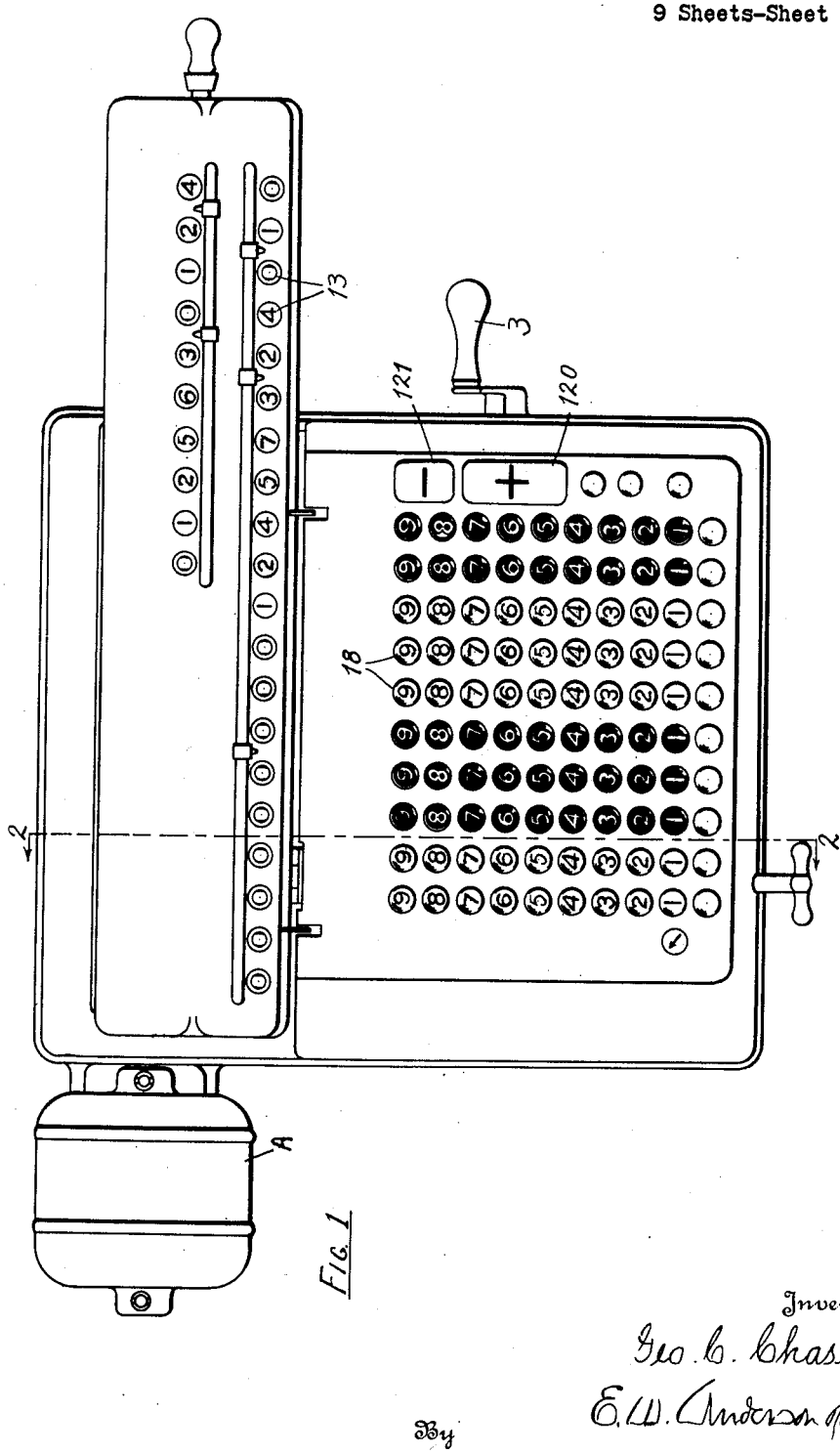
Figure 1 is a plan view of the machine.

Motor operation is controlled by means of an add key 120 and a subtract key 121 (Figs. 1, 7 and 8), each having link engagement 123 with an arm 124 of rock shaft 125, said shaft having at its opposite end an arm 126 connected with a setting lever 128. Lever 128 is provided with a recess 129, between the walls of which lies a lug 130 of reversing clutch lever 111. Oppositely inclined cam faces 131 and 132 of setting lever 128 (Figs. 7, 8 and 9) are adapted alternatively to depress an antifriction roller 133, mounted upon the rearward arm of an intermediately fulcrumed releasing lever 134, against the tension of spring 203. The forward arm of lever 134 is provided with a depending pivoted link 214 having an angularly disposed or hook end 215. Link 214 has guiding engagement between pin 216 and lug 217 of lock lever 200, so that a rocking movement of lever 134 will bring the hook end 215 in contact with pin 216 and raise the lever 200 from locking position, engaging it with latch 204 (Fig. 11).

Upon depression of add key 120 (Fig. 7), shaft 125 is rocked in a clockwise direction as viewed in said figure, and the upper wall of notch 129 of lever 128 contacts with lug 130 of lever 111, rocking the latter and bringing clutch arm 114 into engagement with clutch element 107 of one member of the planetary differential mechanism, to start an additive rotation of the actuating mechanism. The same movement of lever 128 will bring cam face 131 to bear upon roller 133, rocking releasing lever 134 and causing link 214 to lift lock lever 200 out of engagement with link 21 (Fig. 11), whereby the actuating mechanism is free to rotate. Depression of subtract key 121 (Fig. 8) will rock shaft 125 in a counter-clockwise direction as viewed in said figure, bringing the lower wall of notch 129 against lug 130 and rocking lever 111 to bring clutch arm 113 into engagement with clutch element 110 of a second member of the planetary differential mechanism, starting a subtractive rotation of the actuating mechanism. This movement of lever 128 will bring cam face 132 to bear upon roller 133, causing the same movement of releasing lever 134, etc., as in addition.

Movement of lever 128 upon depression of the add or the subtract key will also set a member in position to trip lever 31 upon release of such key, the consequent actuation of arm 24 being utilized to bring the mechanism to rest in full-cycle position.

This member comprises a releasing pawl 136, pivotally mounted at 137 upon releasing lever 134 and having an arm 141 normally lying (Fig. 9) in front of the forward edge of a lug 142 of trigger lever 31. When roller 133 of lever 134 is depressed (Fig. 11), arm 141 of pawl 136 is disengaged from lug 142 and spring 138 will bring said arm to position beneath the lug. When the add or subtract key is released by the operator, spring 203 tends to restore releasing lever 134 to normal position, the completion of the movement being insured by a spring-pressed arm 169 of lever 134, tensioned by contact therewith of a lever 158 positioned by rock-lever 22. As lever 134 is restored arm 141 of pawl 136 will contact with the lower face of lug 142 and lift trigger lever 31 from engagement with lug 30 of stop element 25 (Fig. 12), the latter being rotated by its spring into position for engagement with shoulder 27 of rock lever 22, upon movement of crank arm 20 to dead-center position. As lever 134 reaches normal position an arm 218 of pawl 136 will be brought in contact with a pin 219, fixed in the framing of the machine, moving the pawl and freeing arm 141 thereof from lug 142, trigger lever 31 thereupon being restored to normal position by its spring, with the edge of lug 142 in rear of arm 141.

Stop member 25 having engaged shoulder 27 of rock lever 22, continued movement of said rock lever will carry the arm 24 therewith, as previously stated, a pin 145 mounted upon a rearward extension 144 of arm 24 engaging one of the oppositely inclined cam faces 147 of reversing clutch lever 111 to move the latter to neutral position, whereby the actuating mechanism is released from the action of the motor. Pin 206 of arm 24 will now release rock lever 200 from latch 204, said lever falling upon link 21 (Fig. 11), and arm 24 will contact with the fixed stop 29, whereupon the rebound of the parts and the action of spring 28 will restore crank arm 20 to dead-center position, restoring stop element 25 to restrained position and locking the actuating mechanism by means of lever 200, all as previously described.

I claim:

1. In a calculating machine having numeral wheels and actuating mechanism therefor, stopping means comprising the combination with means operable after the actuating mechanism passes through full cycle position to retard said mechanism and return the same to full cycle position, of means operable automatically to lock the actuating mechanism at rest in full cycle position.

2. In a calculating machine having numeral wheels and actuating mechanism therefor, stopping means comprising the combination with means for retarding the actuating mechanism, of normally restrained means released by said retarding means for locking the actuating mechanism at rest in full cycle position.

3. In a calculating machine having numeral wheels and reversible actuating mechanism therefor, stopping means comprising the combination with means for retarding the movement of said actuating mechanism in either direction, of normally restrained means released by said retarding means for locking the actuating mechanism at rest in full cycle position.

4. In a calculating machine having numeral wheels and reversible rotary actuating mechanism therefor, stopping means comprising the combination with means for retarding and thereafter stopping the actuating mechanism in either of two idle positions, and for returning the same to a common full cycle position, of means operable automatically to lock the actuating mechanism at rest in full cycle position.

5. In a calculating machine having numeral wheels and reversible actuating mechanism therefor, means for stopping said actuating mechanism in full cycle position, comprising the combination with an oscillatory member having driving connection with said actuating mechanism and retarding means engageable with said oscillatory member in either direction of rotation of said actuating mechanism, of a locking member engageable with and holding said oscillatory member in position with the driving connection on dead center.

6. In a calculating machine having numeral wheels, actuating mechanism therefor, driving means for said actuating mechanism including a motor and a manually operable drive controlling member freely retractable from active position upon release, means for stopping the actuating mechanism following retraction of said member, comprising the combination with means for retarding said actuating mechanism, of a member for locking the actuating mechanism at rest in full cycle position, and means operable upon actuation of the drive controlling member to hold the locking member in inactive position and operable upon actuation of the retarding means to release the locking member.

7. In a calculating machine having numeral wheels and actuating mechanism therefor, stopping means comprising the combination with means operable after the actuating mechanism passes through full cycle position to retard said mechanism and to return the same to full cycle position, of a yieldably mounted member for locking the actuating mechanism at rest in full cycle position, and spring cushioning means engaging the locking member.

8. In a calculating machine having numeral wheels and actuating mechanism therefor, means for stopping the actuating mechanism in full cycle position comprising the combination with means operable to retard and stop the forward movement of said mechanism and to allow a rebound, of cushioned means for stopping the rebound and locking the actuating mechanism at rest in full cycle position.

9. In a calculating machine having numeral wheels and actuating mechanism therefor, means for stopping the actuating mechanism at full cycle position, comprising the combination with a yieldable member engageable with said actuating mechanism, of frictional and spring means for cushioning the stop and returning the engaged member to normal position, adapted to provide a maximum of friction during the cushioning and a minimum of friction during the returning action.

10. In a calculating machine having numeral wheels and actuating mechanism therefor, means for stopping the actuating mechanism in full-cycle position, including a lever engageable with said actuating mechanism and provided with a hub, and frictional and spring means for cushioning the stop and returning the lever to normal position, comprising an eccentrically pivoted disk engaging said hub and provided with a crank arm, and a spring engaging said crank arm.

11. In a calculating machine having numeral wheels and actuating mechanism therefor, driving means for said actuating mechanism including a motor, means for stopping said actuating mechanism in full-cycle position, and alternative hand operating means for said actuating mechanism including a detachable drive member operable upon attachment to set the stopping means to cooperative position for hand operation and upon detachment to set the stopping means to cooperative position for motor operation.

12. In a calculating machine having numeral wheels and actuating mechanism therefor, driving means for said actuating mechanism including a motor, stopping means including a member operable to lock said actuating mechanism at rest in full-cycle position, and alternative hand operating means for said actuating mechanism including a detachable drive member operable upon attachment to disable the locking member.

13. In a calculating machine having numeral wheels and actuating mechanism therefor, driving means for said actuating mechanism including a motor, stopping means including a member operable to lock said actuating mechanism at rest in full-cycle position, and alternative hand operating means for said actuating mechanism comprising driving elements, a spring-retracted member engageable with the locking member, and a detachable hand crank engageable with said driving elements and having a journal extension adapted to hold said spring-retracted member in engagement with and thereby to disable the locking member.

14. In a calculating machine having numeral wheels and actuating mechanism therefor, driving means for said actuating mechanism including a motor, a full-cycle stopping member for said actuating mechanism, operating connections therefor, and alternative hand operating means for said actuating mechanism including a detachable drive member operable upon attachment to disable the stopping member.

15. In a calculating machine adapted for either hand or motor-driven operation, a member for controlling the operation of the machine during motor driven operation, and mechanism operable by the attachment of the hand crank for locking said member in inoperative position.

In testimony whereof I affix my signature.

GEORGE C. CHASE.